United States Patent [19]

Kubiak

[11] 3,837,150
[45] Sept. 24, 1974

[54] FILTERING APPARATUS WITH PNEUMATIC INTERMITTENT CLEANING

[75] Inventor: John W. Kubiak, Minnetonka, Minn.

[73] Assignee: The Torit Corporation, St. Paul, Minn.

[22] Filed: Dec. 8, 1972

[21] Appl. No.: 313,582

[52] U.S. Cl. ............... 55/272, 55/288, 55/293, 55/302
[51] Int. Cl. ............................................. B01d 46/04
[58] Field of Search ............ 55/272, 273, 282, 283, 55/293, 301, 302, 303, 304, 305, 312, 313, 288, 379; 417/44

[56] References Cited
UNITED STATES PATENTS

| 2,639,083 | 5/1953 | Rambo | 417/44 |
|---|---|---|---|
| 3,095,289 | 6/1963 | Egan | 55/96 |
| 3,226,225 | 9/1966 | Barr | 55/273 |
| 3,375,641 | 4/1968 | Labbe | 55/293 |
| 3,716,971 | 2/1973 | Reinauer | 55/302 |

OTHER PUBLICATIONS
Chemical Engineering, Air Filter, page 84, Vol. 74, No. 14, McGraw Hill, New York, N.Y.

Primary Examiner—Frank W. Lutter
Assistant Examiner—David L. Lacey
Attorney, Agent, or Firm—Schroeder Siegfried Ryan and Vidas

[57] ABSTRACT

A filtering apparatus employing pneumatic intermittent cleaning in which tubular filter elements are positioned within a tubular enclosure to filter contaminated airflow therethrough. A plurality of nozzles connected to a common manifold are positioned in the tube house adjacent the upper ends of the downstream sides of the filter elements with one nozzle providing a cleaning and agitating action for a plurality of filtering elements. The nozzles are asymmetrically located with respect to the individual filtering elements to provide an efficient shaking of the same to dislodge agglomerated particulate caked on the interior of the filtering elements. The improved apparatus provides for a limited air supply with a predetermined pressure and volume for effective cleaning of the filtering elements to provide for efficient operation of the filtering apparatus and low cost of maintenance of the same.

5 Claims, 5 Drawing Figures

PATENTED SEP 24 1974  3,837,150

FILTERING APPARATUS WITH PNEUMATIC INTERMITTENT CLEANING

My invention relates to a gas filtering apparatus and more particularly to an improved gas filtering apparatus utilizing bag type filters and employing pneumatic intermittent cleaning of the filters.

Gas Cleaning apparatus or filtering apparatus utilizing bag type filters is well recognized and known. Contaminated airflow or gas flow through the filter material provides for the collection of particulate matter from the gas or air on the surface of the filter element or bags. The problem of periodically removing the particulate or caked layer of contaminant from the surface of the bags or filter elements to improve the cleaning efficiency of the same is recognized and has taken a variety of forms. For woven bag type filters, it has been found that mechanical agitation or shaking of the bags is successful to remove the particulate from the surface therefrom, and mechanical agitation caused wear as well and excessive maintenance in connection with the filter. The use of a felted bag type filter for increasing the cleaning efficiency and removing smaller particulate matter is recognized but such bag type filters are not susceptible to mechanical cleaning in that it is difficult to agitate the bag along its entire extent mechanically. Air jet cleaning has been applied to felted type filter elements but such prior arrangements have been complex in that they required individual cleaning jets associated directly with or within each of the individual bag type filter elements for effective cleaning of the same. Such cleaning jets have provided for mechanical agitation of the filter elements along the extent of the same through the generation of a pulse of air at one or both ends of the same. However, the mechanical structure for positioning jet nozzles at one or both extremities of the bag or within the individual bag type filter elements provides a complicated and costly cleaning arrangement for this type of filtering apparatus.

The present invention is directed to an improved filtering apparatus utilizing bag type filters preferably of the felted material type for effective wide range of particulate removal. The improved filtering apparatus employs a simplified cleaning system in the form of a pneumatic pulse generating apparatus in which a single nozzle is located with respect to a plurality of adjacent tubular elements to effectively agitate all simultaneously and remove collected dirt therefrom through mechanical agitation and reverse airflow therethrough. The simplified arrangement of a manifold with a reduced number of nozzles for a tube house having a predetermined number of filtering elements therein reduces the requirement for high pressure air consumption, simplifies the installation and provides an improved and effective cleaning arrangement for the filter elements. With this improved arrangement, the particulate matter is not re-entrained into the filter medium but is rather deposited by gravity and renewed airflow through the filtering apparatus into a gravity collector section at the base of the enclosure of the tube house. The improved filter cleaning apparatus requires only a single air pulse from the various fixed nozzles when airflow through the filtering apparatus has been terminated to provide a shaking or agitation of the filter bags through the generation of a shock wave along their entire extent to remove the entrained particulate matter caked on the upstream side of the filtering surface and to deposit the same in the clean-out section. The improved filtering apparatus utilizes a fixed air source having a predetermined pressure and volume which is periodically turned on whenever the filtering apparatus is shut down from its normal cleaning cycle to provide a single jet pulse to nozzles located adjacent and in between a plurality of the filtering elements to effect a cleaning of the same. The improved filtering apparatus requires no internal support for the filtering elements and effectively increases the efficiency and life of the filtering elements.

It is therefore the object of this invention to provide an improved gas filtering apparatus employing an improved pneumatic intermittent cleaning arrangement.

Another object of this invention is to provide in a simplified filtering apparatus of this type an improved cleaning arrangement whereby a single pulse of high pressure air generated when the cleaning apparatus is shut down will be sufficient to agitate the bag type filter elements and produce a reverse airflow therethrough to effectively clean the same.

A still further object of this invention is to provide an improved filtering apparatus having a cleaning arrangement in which high pressure air is released from a fixed air supply to effect an improved cleaning operation whenever the filtering apparatus is shut down.

Another object of this invention is to provide in a filtering apparatus of this type an improved cleaning arrangement in which a compressed air supply stored in the tank at the filtering apparatus will provide for a uniform jet pulse through a plurality of nozzles each associated with a plurality of bag type filtering elements and asymmetrically located with respect to each filtering element to effectively clean the same.

These and other objects of this invention will become apparent from a reading of the attached description together with the drawings wherein.

Figure 1:
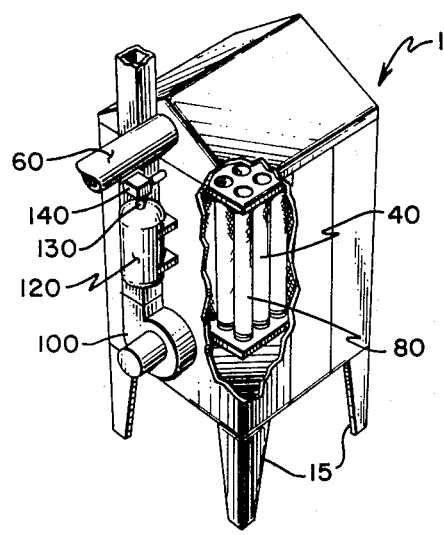
FIG. 1 is a perspective view of the improved filtering apparatus with parts broken away.
Figure 2:
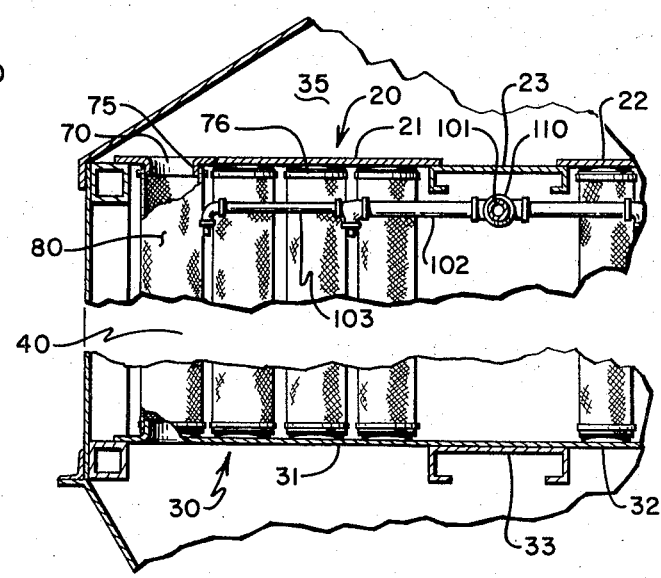
FIG. 2 is a front elevation view of the same with parts removed to disclose the arrangement of the bag type filtering elements and the cleaning nozzles therefore.

My improved filtering apparatus utilizing the tube type filters with the improved cleaning arrangement for the same is shown in elevation and sectional views in FIGS. 1 and 2. It incorporates basically a tube house, indicated generally at 10, wherein an appropriate enclosure having a sealable door member 12 is positioned on the front side of the same. The tube house or enclosure is mounted on the suitable frame 15 supporting the same above the ground or structure upon which it is mounted to facilitate clean-out of the same. As will be seen in FIGS. 1 and 2, the interior of the tube house or enclosure is divided by a pair of baffle members 20 and 30 which effectively divide the enclosure or tube house into an inlet or upper section 35, an intermediate or exhaust section 40 and a clean-out or collector section 50, the clean-out or lower section having a suitable valve or gate type closure member 52 at the base of the same permitting removal of dirt or particulate from within the enclosure or collector section 50. The upper section of the enclosure has a suitable port or aperture 55 therein adapted to be connected to a suitable conduit such as is indicated at 60 leading to an area or room from which contaminated air is evacuated for the purpose of removing the contaminants or particulates from the same. Individual baffle plates extend across the surface of the enclosure or tube house and each have a plurality of apertures 70 therein, the apertures being arranged in rows and providing the passages by means of which air from the inlet section or chamber 35 will be directed through the tubular filtering elements indicated generally at 80, to be hereinafter described. Each of the apertures has an annular flange 75 projecting therefrom with the flanges 75 on both the upper and lower baffles 20 and 30 projecting within the intermediate or exhaust section 40 of the enclosure. As will be best seen in FIGS. 2 and 4, the baffles 20 dividing the enclosure are formed by individual baffle plates 21 and 22 with an intermediate connecting section 23 to completely divide the enclosure and define the upper inlet section 35 within the top portion of the enclosure. Similarly, the baffle section 30 is formed by plates 31, 32 with an intermediate connecting portion 33 to divide the enclosure and complete the intermediate section or exhaust section 40 of the enclosure and define with the lower portion of the enclosure the clean-out or contaminant removal section 50 of the enclosure. As shown in the drawings, the plates 21, 22 and 31, 32 are identical in construction and each have a plurality of rows of apertures therein which when assembled within the enclosure align to define with their respective flanges 75 the aligned mounting openings for the tubular filter elements 80. The filter elements are preferably made of a dacron material or synthetic material which is felted to provide a cleaning medium to enable removal of particulate down to the submicron range. The felt material as a filter medium requires a small amount of particulate to be introduced into the fibers for most efficient cleaning, but a gradual buildup resulting in a layer or caking of contaminant on the surface of the felt medium due to an agglomeration of the particles will increase the pressure drop and significantly reduce the airflow therethrough. Thus, the caked or layered contaminant or particulate must be removed periodically through a cleaning process, such as shaking, to maintain filtering air flow for the filter medium.

Figure 4:
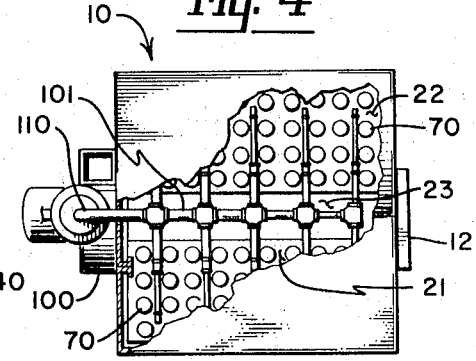
FIG. 4 is a plan view of the filtering apparatus with parts broken away showing the arrangement for the cleaning nozzles and manifolds supplying the same.

In the present disclosure, the filter elements are tubular in form and are made of a felted material with a suitable woven background, the felted material being positioned interior of the tubular element. The open extremities of the tubular element are mounted on the flanges 75 of the plates, 21, 22, 31, and 32, and extend between the plates. They are secured to the annular flanges and suitable clamps, such as is indicated at 76, which secure the extremities of the tubular elements on the plates and surrounding the flanged openings to permit the passage of air therethrough. It will be noted that the passages through the interior of the tubular elements extend through the extent of the intermediate section and are common to the removal 50 and inlet 35 sections respectively. Because the removal section is closed, the gas or air being drawn through the inlet section will actually enter through the apertures in the baffles 21 and 22 and pass through the interior of the tubular elements 80 being drawn through the felted walls of the same and to the interior of the intermediate section 40 wherein it will be directed through the exhaust port (not shown). The exhaust port has preferably a suitable blower or exhaust fan 100 mounted thereon by means of which the air may be drawn in through the inlet section and the filter elements to be exhausted at the outlet of the blower 100 in a conventional manner or directed back to the enclosure from which the contaminated air is taken. It will be noted as indicated in FIGS. 2 and 4 that the apertures in the baffles 20 and 30 and hence the positioning of the tubular elements 80 connected therebetween are in uniform spacing across the enclosure except for the center section as defined by the support plates 23 and 33. This permits an area within the enclosure for mounting of the tubular elements or changing of the same for maintenance purposes with the access thereto being through the door 12 in the front of the enclosure. The intermediate section 40 with the door closed is sealed except for the outlet port communicating with the blower or exhaust fan 100 which is normally mounted on the tubular enclosure but may be positioned remote therefrom. As contaminated air or gas is directed into the enclosure and passes through the baffle 20 and into the tubular elements 80, the particulate carried by the gaseous medium or air will be deposited on the inner surface of the tubular members 80 with the clean gas or air being exhausted by the blower 100. A buildup of the particulate on the internal surface of the filter medium will occur with continued operation requiring periodic cleaning of the interior surface of the filter medium.

Figure 5:
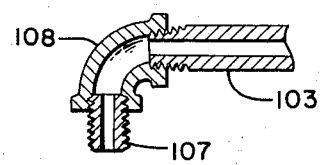
FIG. 5 is a sectional view of a cleaning nozzle for the improved filtering apparatus.

The improved cleaning apparatus for the tube house is provided by means of a manifold type arrangement 110 having a main inlet line 101 and transversely extending lines 102, 103 to nozzles 107 along the extent of the same. As will be best seen in FIG. 4, the inlet manifold 110 extends through the wall of the enclosure and along the width of the same with the transversely extending branch members 102, 103 being connected thereto in a tree shaped configuration. The sections 102 and 103 are of differing internal diameters insuring with the larger sizing of the main manifold section 101 for a uniform and constant volume airflow to the nozzles 107 connected thereto and projecting downwardly therefrom. This entire assembly is mounted within the enclosure and between the baffles 20 and 30 in the intermediate or exhaust section 40 of the enclosure. They are positioned adjacent the upper baffle 20 and near the mounting of the tubular elements 80 on the depending flanges 75 of the plates 21 and 22 such that the nozzles will be equidistantly spaced between four adjacent apertures or tubular elements, as will be best seen in FIG. 4. The nozzles, as will be seen in FIG. 5, are basically tubular inserts 107 positioned in the elbow members 108 connected to the pipes 102, 103, to provide for a constant cross section or orifice sizing for the nozzles adjacent or intermediate groups of the tubular elements within the enclosure. Thus, one nozzle will serve four adjacent tubular elements to provide an air pulse discharge therefrom to provide a mechanical shaking of the tubular elements adjacent thereto. It will be noted that with respect to a single bag, the nozzles are located asymmetrically with respect to the exterior surface thereof. That is the nozzle will be close to only one point on the exterior surface of the bag and the pulse or air wave generated therefrom will be directed on the respective tubular elements with the greatest force at the surfaces closest to the axis of the nozzle. This provides an agitation which is generated along the entire extent of the bag as a given volume of air is discharged from the nozzle to effect a shaking of the same, dislodging the cake particulate matter from the interior surface of the filter medium, and permitting the same to be discharged by gravity into the hopper or contaminant collector section 50 on the lower portion of the tube house. The cleaning operation takes place only when the filtering apparatus is shut down, that is, no airflow is being directed through the inlet of the same due to stopping of the blower, and the air discharged from the nozzle also causes a reverse airflow through the filter medium or fabric 80 to additionally remove contaminant from the inner surface of the tubular members.

I have found that a given volume of air at a particular pressure to be best effective for cleaning the tubular elements or filter medium in a tube house with a single air pulse. This will take place at the time when the normal filtering operation is shut down. As will be indicated in FIGS. 1 and 3, a pressure tank 120 is mounted on the rear of the enclosure with an outlet pipe 130 and valve 140 connected thereto and leading to the manifold 110 feeding the air nozzles within the enclosure. As will be hereinafter noted, the pressure in the tank which is of a fixed volume will be set or adjusted at a particular pressure level so that a given amount of air may be discharged from the pressure source or tank 120 to the nozzles during a cleaning operation. I have found that pressures from 30 – 110 psi is satisfactory for single pulse cleaning of such filter medium. Thus, in the present disclosure, and for a tube house employing 80 filter elements such as is suggested in FIG. 4, a tank of a 30 to 60 gallon capacity will provide a suitable air volume for the 20 discharge nozzles positioned between the 80 filter elements or one nozzle per four filter elements for effective cleaning of the same. This will provide approximately 4 to 8 cubic feet of air at 60 psi or in a range from 0.14 to 0.4 cubic feet of air per nozzle to be discharged for an effective cleaning operation. Thus for a single pulse cleaning operation the pressure at the nozzles and the volume of air discharged will require an optimum sizing of equipment such that from 0.14 to 0.4 cubic feet of air discharged per nozzle at a pressure range of from 30 – 110 psi will provide an efficient cleaning operation through mechanical agitation of the bags and reverse airflow therethrough. This ratio will be substantially constant for any number of bags and the appropriate storage air volume will be selected accordingly.

Figure 3:
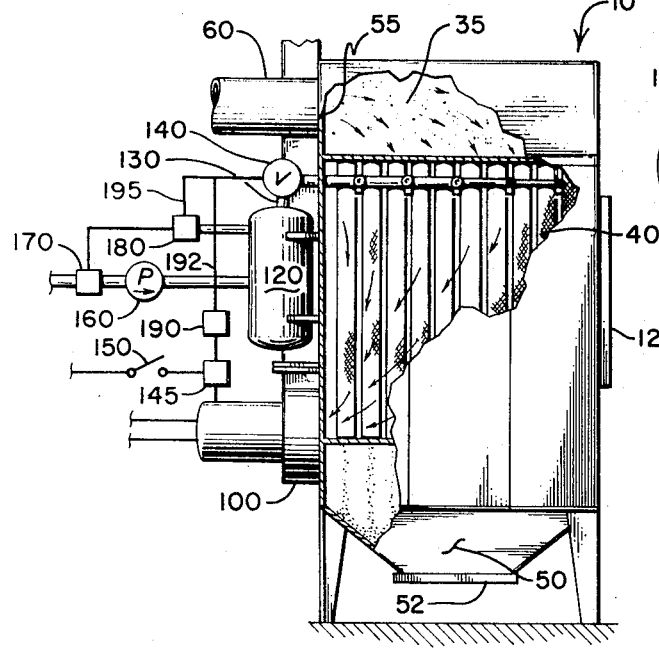
FIG. 3 is a side elevation of the improved filtering apparatus showing the mounting of the air storage tank and the blower for the same.

As will be seen schematically in FIG. 3, the improved filtering apparatus with its cleaning arrangement may be manually or automatically operated. Thus, the blower 100 will be energized through a suitable starter 145 controlled from a manually operated switch, indicated at 150, to permit operation of the filtering apparatus under manual control. The manual control 150 may be suitably substituted for by an automatic control providing for operation of the filtering apparatus under any desired condition. The operation of the filtering apparatus will be continued until such time as the filtering elements 80 become loaded at which time the apparatus will be shut down by opening of the manual switch 150 or automatic control stopping energization of the motor or blower 100 and causing a cessation of airflow through the inlet filter pipe 60 to the enclosure. Under normal operation, the storage tank 120 will be charged, that is, will have air therein at a particular pressure, preferably 60 psi. The tank will have been filled either by operation of a suitable pump, such as is indicated at 160, or through an appropriate valve (not shown) connecting the tank to a convenient or suitable higher air pressure supply enabling the tank to be filled to a capacity at desired pressure levels. Thus in FIG. 3, the pump 160 has a suitable control 170 operating from a pressure sensor indicated generally at 180 which senses the pressure within the tank 120 and will energize the operation of the pump whenever the pressure within the tank drops to a predetermined low level, such as for example, 4 or 5 psi causing energization of the motor and hence the operation of the pump 160 until the tank fills to a pressure such as a level slightly above the desired pressure rating of 60 psi at which point the pump operation will be terminated. This will provide a fixed air supply for the manifold 110 and the nozzles 107 associated therewith for the cleaning operation. The cleaning operation will take place only when the air flow through the tube house is shut off. As disclosed schematically in FIG. 3, the starter 145 of the blower 100 has associated therewith a timer 190 which will be energized whenever the starter moves to an off position causing closure of a circuit indicated at 192 to operate the valve 140 connecting air supply 120 to the manifold 110. This will permit the discharge or the volume of air stored within the tank 120 through the jet nozzles to effect a one pulse cleaning operation of the tubular filtering elements within the enclosure. After predetermined timing of the timer 190 following starting of the same, the timer will shut down and reset itself closing the valve 140. The valve 140 is interlocked with the pressure sensor as indicated by the connection 195 so that the starter for the pump 160 or the valve re-energizing the pressure tank will not take place until the valve 140 is again closed. Thus, in the operation of our improved filtering apparatus, a very simplified cleaning arrangement is provided through the use of a single manifold and externally positioned jet nozzles located adjacent and intermediate a plurality of tubular elements. These nozzles effectively clean the filtering elements by mechanically shaking the same through the discharge of an air blast causing movement of the filtering elements to discharge the particulate layer encrusted on the inner surface of the same. In addition, a slight reverse airflow through the filter elements will additionally remove contaminant particles therefrom and allow the same to be discharged through the open lower extremity of the tubular elements and the openings in the baffles 30 to the collection chamber 50 for the contaminant.

In the operation of the filtering apparatus, a normal downflow of the air through the filter medium is provided collecting the contaminant particles in the air or gaseous medium on the inner surface of the filtering elements wherein it is discharged by pneumatic shaking due to air blast positioned adjacent the same. The nozzles are so positioned that the air discharge is asymmetrically located with respect to the entire exterior surface of the individual filtering elements causing a wave generation along the extent of the same to shake the tubular elements and loosen the caked layer within to permit discharge of the same by gravity through the open extremity of the filtering elements. The improved cleaning apparatus provides for a fixed air supply in the form of a pressure tank on the enclosure which may be charged through a pump or from a higher pressure source to a predetermined pressure level. We have found that a given air discharge at a predetermined pressure will effectively clean a tubular filtering element in a single pulse operation providing an economical cleaning operation with a minimum of maintenance therefrom. The operation of a single release valve from the pressure tank will effectively energize the manifolds and, hence, all nozzles to provide a constant air-flow therethrough as the pressure and air volume in the storage tank is diminished. This will generate a pneumatic shaking of the tubular filtering elements along their extent through the application asymmetrically of a pressure force thereon to dislodge the layer of particulate encrusted on the inner surface of the tubular elements and causing the same to be deposited by gravity into the discharge or storage chamber in the lower portion of the tube house. This air will also provide an incipient reverse airflow through to the interior of the tubular elements causing further dislodge of the particulate matter from the interior of the filter element to aid in the cleaning of the same. The improved cleaning apparatus is simplified and requires a minimum of air nozzles and an air supply to provide an adequate cleaning operation for the tube house such that pneumatic intermittent cleaning will be effected and intermittent operation of the filtering apparatus may be employed with a maximum of efficiency in cleaning.

In considering this invention it should be remembered that the present disclosure is illustrative only and the scope of the invention should be determined by the appended claims.

What is claimed is:

1. A filtering apparatus comprising, an enclosure having a pair of spaced dividing baffles positioned therein in a parallel relationship and dividing said enclosure into upper, lower and intermediate sections with respect to said enclosure, each baffle having a plurality of openings therein with a transversely extending collar surrounding the apertures and projecting between the baffles of the enclosure, a plurality of tubular filter elements open at both extremities positioned in the intermediate section of the enclosure with the extremities of the same mounted over the transversely extending collars and secured thereto with the tubular elements extending between the baffles in spaced parallel relationship, an inlet air passage positioned in the enclosure in the upper section thereof and communicating with the upper section means for moving air through said enclosure, an air outlet passage positioned in the enclosure and communicating with the intermediate section of the enclosure being connected to the means for moving air through the enclosure from the upper section and the tubular elements to the intermediate section and the outlet therein, a contaminant withdrawal port positioned in the enclosure in the lower portion thereof and common to the lower section of the enclosure, a cleaning manifold positioned in the enclosure in the intermediate section and having a plurality of discharge nozzles positioned along the extent of the same and adjacent the baffle common to the upper section with the nozzles being directed downwardly toward the lower section of the enclosure and along the extent of the tubular elements and between adjacent tubular elements, each of said nozzles having the same internal dimension and being positioned equidistantly between four adjacent tubular filter elements in a manner such that any one of said tubular elements has only one nozzle adjacent the same, a stored air supply having a predetermined pressure and volume connected to said manifold to feed all of said nozzles simultaneously, and control means for connecting the stored air supply to the nozzles upon cessation of operation of the means for moving air through the enclosure, said air supply being adapted to provide a jet burst from said nozzles along the extent of the tubular elements to dislodge contaminants on the inner surface of the same permitting gravity discharge of said contaminants through the tubular elements and into the lower section of the enclosure while providing for a reverse airflow through the filter elements.

2. The filtering apparatus of claim 1 in which the control means for connecting the stored air supply to the nozzles after cessation of the operating means includes a timer means.

3. The filtering apparatus of claim 2 in which the stored air supply includes a pump and pressure tank with a valve means connecting the pressure tank to the manifold and operated by said timer means.

4. The filtering apparatus of claim 3 in which the pressure tank includes a pressure responsive means operative to energize the pump whenever the pressure in the tank drops below a predetermined pressure.

5. A filtering apparatus comprising, a tube house enclosure having an inlet section and an exhaust section, a pair of spaced baffles positioned in the tube house enclosure and defining with the enclosure said sections, a plurality of tubular filter elements positioned between the baffles and connected in spaced parallel relationship being in flow communication to one of said sections through openings in one of said baffles said tubular filtering elements coupling the inlet section and the exhaust section, means connected to the exhaust section for moving contaminated gas through the inlet section and tubular filtering elements to be exhausted at the exhaust section with the contaminants being collected on the inner surface of the tubular elements, a clean out section defined by said enclosure and one of said baffles with said baffles having openings therin to which said filter elements are attached and located lower most in said enclosure to receive contaminants from the inner surface of the tubular elements through deposit by force of gravity, cleaning apparatus including a pipe type manifold with discharge nozzles connected thereto and positioned in the exhaust section, said discharge nozzles being spaced equidistantly between four adjacent tubular filtering elements in a manner such that any one of said tubular elements has only one nozzle adjacent the same with said nozzles having the same internal diameter to provide the same volume of jet airflow therefrom, a fixed source of air under a predetermined pressure and having a predetermined volume connected to the pipe manifold to provide a single air jet discharge from said nozzles along the extent of the tubular elements in the exhaust section and in a direction along the extent of the tubular elements, said air discharge moving the filter elements along their extent and providing a reverse airflow from the exhaust section to the interior of the tubular elements to dislodge contaminants thereon, and means controlling the discharge of said air source to said cleaning apparatus and responsive to a cessation of operation of the means moving air from the inlet section through the tubular filter elements to the exhaust section.

* * * * *